US010738977B2

(12) United States Patent
Ernst

(10) Patent No.: US 10,738,977 B2
(45) Date of Patent: Aug. 11, 2020

(54) DETACHABLE SUPPORT AND LUMINAIRE

(71) Applicant: COLOUR-LED WIRELESS LIGHTS LIMITED, Shenzhen (CN)

(72) Inventor: Norbert Ernst, Shenzhen (CN)

(73) Assignee: COLOUR-LED WIRELESS LIGHTS LIMITED, Shenzhen (CN)

( * ) Notice: Subject to any disclaimer, the term of this patent is extended or adjusted under 35 U.S.C. 154(b) by 0 days.

(21) Appl. No.: 16/450,432

(22) Filed: Jun. 24, 2019

(65) Prior Publication Data

US 2019/0309930 A1    Oct. 10, 2019

Related U.S. Application Data

(63) Continuation-in-part of application No. PCT/CN2017/079138, filed on Mar. 31, 2017.

(51) Int. Cl.
*F21V 17/08* (2006.01)
*F16M 11/04* (2006.01)
(Continued)

(52) U.S. Cl.
CPC ........... *F21V 17/08* (2013.01); *F16M 11/041* (2013.01); *F16M 11/38* (2013.01); *F21V 17/06* (2013.01);
(Continued)

(58) Field of Classification Search
CPC ...... F21V 21/108; F21V 21/145; F21V 21/18; F21V 21/14; F21V 21/26; F21V 21/28;
(Continued)

(56) References Cited

U.S. PATENT DOCUMENTS 4,463,413 A  *  7/1984  Shirley ................. F21V 21/14
                                                     362/18
6,065,849 A     5/2000  Chen
                        (Continued)

FOREIGN PATENT DOCUMENTS

CN    103791462 A    5/2014
CN    203784647 U    8/2014
                    (Continued)

OTHER PUBLICATIONS

International search report issued in corresponding international application No. PCT/CN2017/079138 dated Dec. 29, 2017.

*Primary Examiner* — Alexander K Garlen
*Assistant Examiner* — Colin J Cattanach
(74) *Attorney, Agent, or Firm* — Hauptman Ham, LLP

(57) ABSTRACT

A detachable support is provided. The detachable support includes a first arm having a first connection portion, a second arm having a second connection portion, and a frame. The frame has a first end portion and a second end portion, which are respectively hinged to the first arm and the second arm. The first connection portion and the second connection portion are operable to be inserted and fixed into two grooves respectively, and the two grooves are defined in a housing to be mounted. The first arm has a hole, the housing to be mounted is provided with a spring loaded bolt, and the spring loaded bolt is operable to be inserted into the hole to lock the first arm. No tool is required throughout installation and removal processes of the detachable support according to the present disclosure, thereby improving the efficiency of the installation and removal processes.

11 Claims, 4 Drawing Sheets

(51) Int. Cl.
*F16M 11/38* (2006.01)
*F21V 17/06* (2006.01)
*F21V 21/30* (2006.01)
*F21V 21/116* (2006.01)
*F21V 21/28* (2006.01)
*F21V 21/14* (2006.01)
*F21V 21/18* (2006.01)
*F21V 21/13* (2006.01)
*F21V 21/108* (2006.01)
*F21V 21/34* (2006.01)
*F21W 131/406* (2006.01)
*F21L 4/04* (2006.01)
*F21V 21/26* (2006.01)
*F21V 21/04* (2006.01)

(52) U.S. Cl.
CPC ............ *F21V 21/116* (2013.01); *F21V 21/30* (2013.01); *F21L 4/04* (2013.01); *F21L 4/045* (2013.01); *F21V 21/045* (2013.01); *F21V 21/108* (2013.01); *F21V 21/13* (2013.01); *F21V 21/14* (2013.01); *F21V 21/145* (2013.01); *F21V 21/18* (2013.01); *F21V 21/26* (2013.01); *F21V 21/28* (2013.01); *F21V 21/34* (2013.01); *F21W 2131/406* (2013.01)

(58) Field of Classification Search
CPC ........ F21V 21/30; F21V 21/116; F21V 21/06; F21V 21/045; F21V 21/13; F21V 21/34; F21L 4/04; F21L 4/045; F21S 6/005; F21S 6/006; F21S 8/043; F21W 2131/406
See application file for complete search history.

(56) References Cited

U.S. PATENT DOCUMENTS

| | | | |
|---|---|---|---|
| 6,592,241 B1* | 7/2003 | Kovacik | F16M 11/10 362/275 |
| 2004/0080935 A1* | 4/2004 | Wu | F21V 21/02 362/652 |
| 2004/0190292 A1* | 9/2004 | Wu | F21S 8/065 439/299 |
| 2005/0111223 A1* | 5/2005 | Lee | F21L 14/00 362/269 |
| 2008/0030998 A1* | 2/2008 | Tsai | F21V 21/06 362/382 |
| 2011/0141737 A1* | 6/2011 | Gu | F21S 6/003 362/249.1 |
| 2013/0027934 A1* | 1/2013 | Velazquez | F21V 23/06 362/249.01 |
| 2015/0198298 A1* | 7/2015 | Scarlata | F21S 9/00 362/184 |
| 2017/0299161 A1* | 10/2017 | Boorom | F21V 21/26 |
| 2017/0307194 A1* | 10/2017 | Fuma | F21V 17/02 |
| 2018/0224101 A1* | 8/2018 | Qiu | F21V 21/28 |

FOREIGN PATENT DOCUMENTS

| | | |
|---|---|---|
| CN | 204403940 U | 6/2015 |
| CN | 204459681 U | 7/2015 |
| CN | 204829793 U | 12/2015 |
| CN | 105674219 | 6/2016 |

* cited by examiner

DETACHABLE SUPPORT AND LUMINAIRE

CROSS-REFERENCE TO RELATED APPLICATION(S)

This application is a continuation-in-part of PCT application No. PCT/CN2017/079138, filed Mar. 31, 2017, the disclosure of which is hereby incorporated by reference in its entirety.

TECHNICAL FIELD

The present disclosure relates to a support, and particularly to a detachable support and a luminaire.

BACKGROUND

Currently, many products in the market need to be capable of adjusting angles and directions thereof, such as luminaires, cameras, loudspeaker boxes, nozzles, fans, and so on. The supports for these products generally require an angle adjusting function. Especially for some professional products, their supports need to be firm, easy to use, and with a simple appearance and a compact structure, thereby minimizing an additionally increasing volume for the products. Fixed supports usually have a relative high firmness, but special tools will be involved during both assembly and disassembly procedures, and when being disassembled, mounting fittings such as screws and gaskets should be stored for later assemblies, resulting in complicated processes of adjustment, assembly, and disassembly.

SUMMARY

A detachable support is provided, which can be installed and removed without tools, thereby improving the efficiency of installation and removal.

A luminaire is further provided. The luminaire employs the above-identified detachable support.

In order to realize the above-mentioned purpose, technical solutions according to embodiments of the present disclose are described as follows.

A detachable support is provided. The detachable support includes a first arm, a second arm, and a frame. The first arm has a first connection portion, and the second arm has a second connection portion. The frame has a first end portion and a second end portion, which are respectively hinged to the first arm and the second arm. The first connection portion and the second connection portion are operable to be inserted and fixed into two grooves respectively, and the two grooves are defined in a housing to be mounted. The first arm has a hole, the housing to be mounted is provided with a spring loaded bolt, and the spring loaded bolt is operable to be inserted into the hole to lock the first arm.

As an implementation, the first arm and the second arm are symmetrically arranged. The first arm includes a free end and a fixed end, the fixed end is hinged with the first end portion, and the first connection portion of the first arm is located close to the fixed end.

As an implementation, the width of the fixed end is less than that of the free end.

As an implementation, the detachable support further includes a brake disk and a brake member. The brake disk is fixed on the first arm, the brake member is connected with the frame, and the brake member presses the brake disk to prevent the first arm from rotating relative to the frame.

As an implementation, the frame includes a U-shaped frame and two abutment rods. The first end portion and the second end portion are formed on the U-shaped frame, and the two abutment rods are rotatably connected to the U-shaped frame. Each abutment rod is provided with a first abutment member, the U-shaped frame has a second abutment member, and the first abutment member is operable to be abutted with the second abutment member such that each abutment rod is stationary relative to the U-shaped frame.

As an implementation, the U-shaped frame further has a third abutment element, the first abutment member is operable to be abutted with the third abutment element such that the normal projection of each abutment rod is substantially fell into the normal projection of the U-shaped frame is located.

As an implementation, each of the first connection portion and the second connection portion has a cross section in a substantial T-shape or dovetail shape.

As an implementation, the hole is configured as a countersunk hole.

A luminaire is further provided. The luminaire includes a housing to be mounted and the detachable support described in any of the preceding implementations. The housing to be mounted has the two grooves and the spring loaded bolt corresponding to the hole. The first connection portion of the first arm and the second connection portion of the second arm are operable to be inserted and fixed into the two grooves respectively. The spring loaded bolt is operable to be inserted into the hole to lock the first arm.

As an implementation, the luminaire further includes an abutment spring. The abutment spring is abutted between an inner wall of the groove and the first arm, such that the first arm is attached to the inner wall of the groove.

As an implementation, the length of each of the first arm and the second arm is half of the height of the housing to be mounted.

As an implementation, a hinge point between the first arm and the frame, a hinge point between the second arm and the frame, and the centroid of the housing to be mounted are collinear.

Advantages or beneficial effects of the embodiments of the present disclosure are described as follows.

An installation process of the detachable support of the present disclosure can be accomplished by respectively inserting the first arm and the second arm into the two grooves of the housing to be mounted and enabling the spring loaded bolt of the housing to be mounted to be automatically inserted into the hole under an action of an elastic force. A removal process of the detachable support can be accomplished by simply retracting the spring loaded bolt out from the hole. No tool is required throughout the installation and removal processes, thereby improving the efficiency of the installation and removal processes.

BRIEF DESCRIPTION OF THE DRAWINGS

To describe the technical solutions in the embodiments of the present disclosure or in the related art more clearly, the following briefly introduces the accompanying drawings required for describing the embodiments. Apparently, the accompanying drawings in the following description merely illustrate some embodiments of the present disclosure. Those of ordinary skill in the art may also obtain other drawings based on these accompanying drawings without creative efforts.

DETAILED DESCRIPTION OF ILLUSTRATED EMBODIMENTS

Technical solutions in the embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

The ordinal qualifiers (e.g., the first, the second, etc.) employed in the following embodiments of the present disclosure are merely distinctive phrases used for clearly illustrating similar features in the present disclosure, and not intended to represent the arrangement or usage order of corresponding features.

The detachable support of the present disclosure is operable to be connected to products such as luminaires, sensors, hair dryers, shower heads, and reflectors, that require adjustment of the mounting angle and orientation. The detachable support is typically mounted on the product's housing to adjust the mounting angle and orientation of the product.

Figure 1:
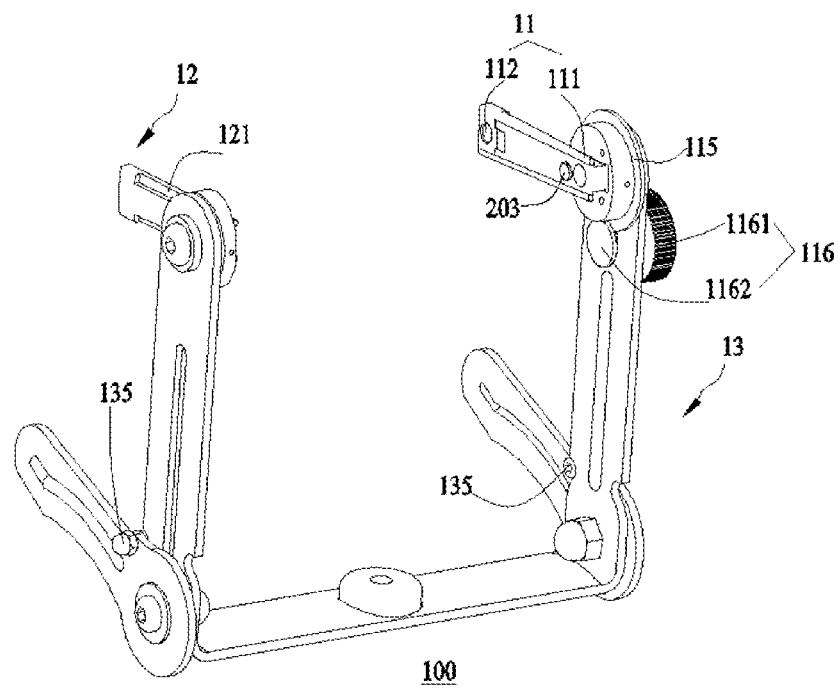
FIG. 1 is a schematic structural view of a detachable support according to an embodiment of the present disclosure.
Figure 2:
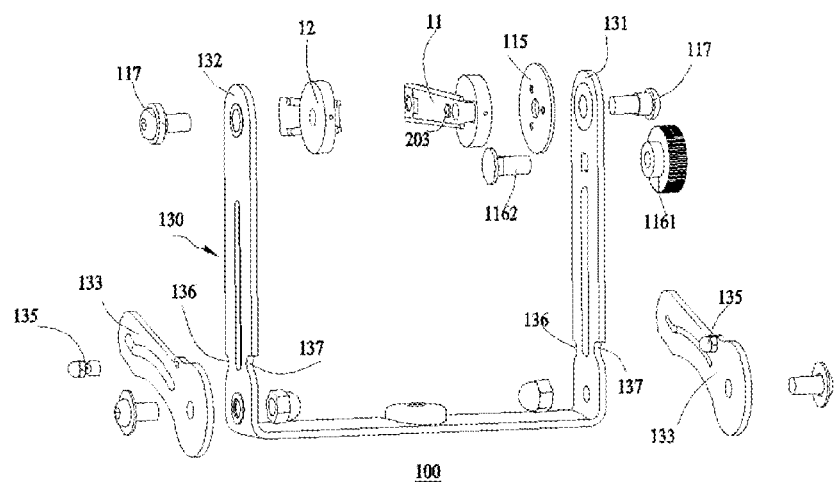
FIG. 2 is an exploded schematic view of the detachable support illustrated in FIG. 1.
Figure 3:
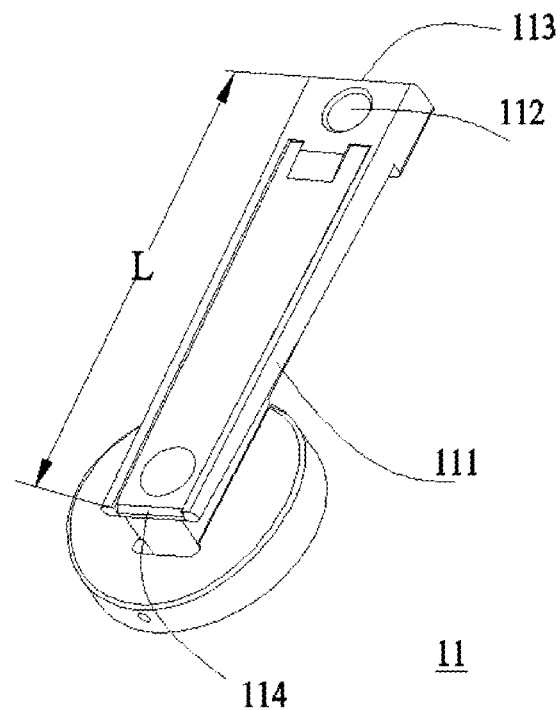
FIG. 3 is a schematic structural view of a first arm illustrated in FIG. 1.
Figure 4:
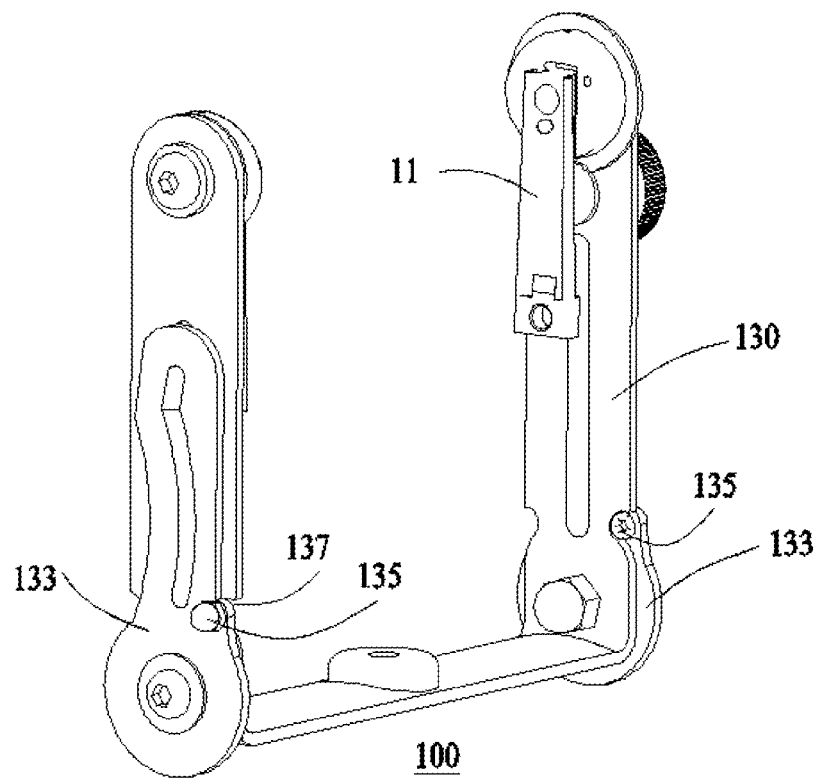
FIG. 4 is a schematic view of a detachable support when an abutment rod is stowed.
Figure 5:
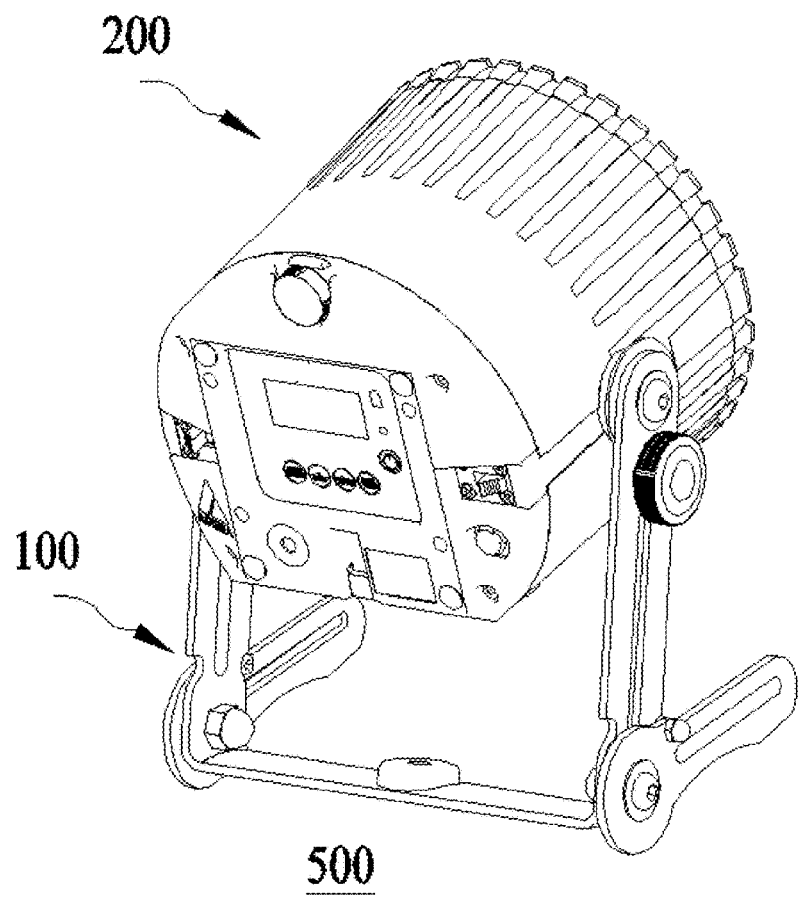
FIG. 5 is a schematic structural view of a luminaire with the detachable support illustrated in FIG. 1.
Figure 6:
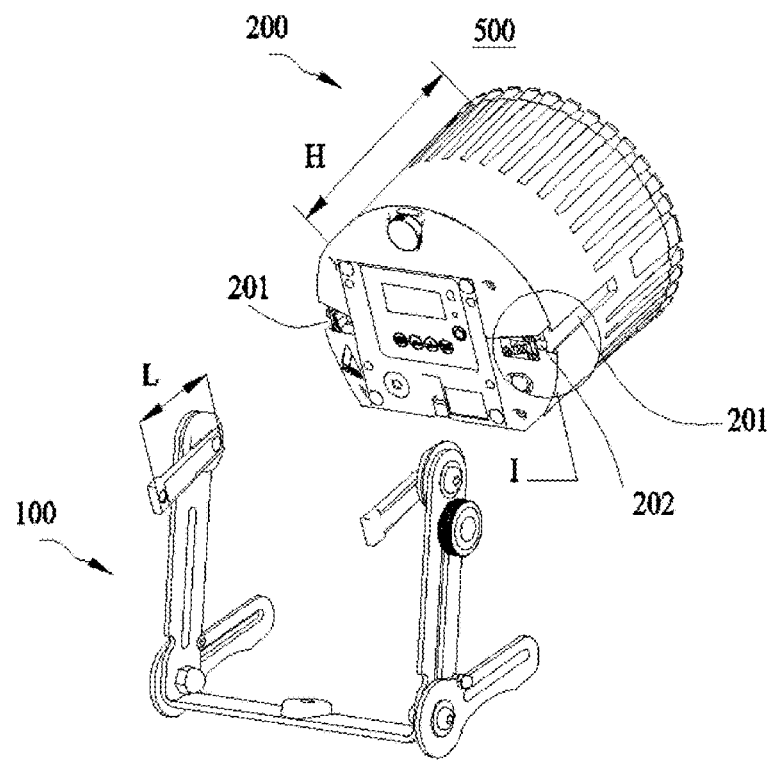
FIG. 6 is an exploded perspective view of the luminaire illustrated in FIG. 5.
Figure 7:
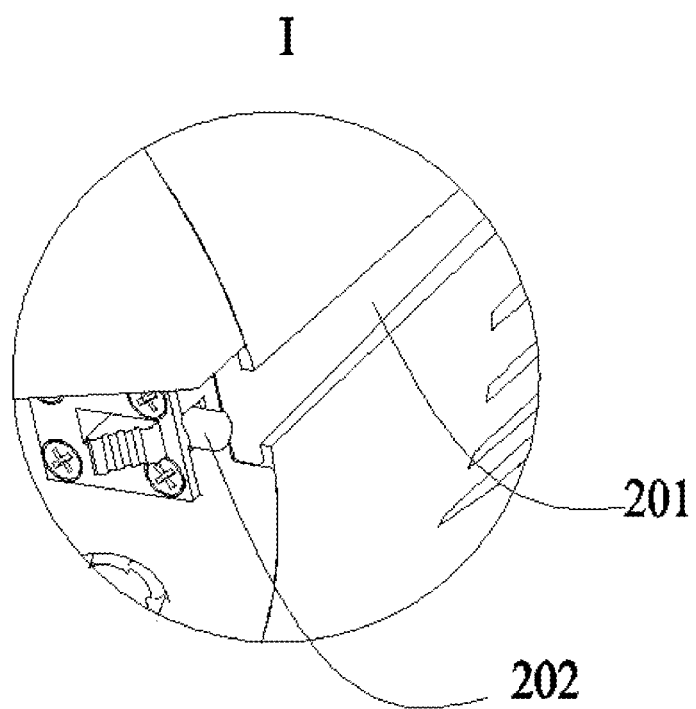
FIG. 7 is an enlarged schematic view of a circle I illustrated in FIG. 6.

Referring to FIGS. 1 to 7, a detachable support 100 is provided. The detachable support 100 of the present disclosure includes a first arm 11, a second arm 12, and a frame 13. The frame 13 includes a first end portion 131 and a second end portion 132. The first arm 11 is hinged with the first end portion 131 through a screw 117, and the second arm 12 is hinged with the second end portion 132 through the screw 117. The first arm 11 has a hole 112 and a first connection portion 111, and the second arm 12 has a second connection portion 121. FIG. 5 and FIG. 6 are schematic structural views of a luminaire with the detachable support according to the present disclosure. In the embodiments of the present disclosure, the housing to be mounted 200 of the luminaire 500 is provided with two grooves 201, and the two grooves 201 are disposed in one-to-one correspondence with the first arm 11 and the second arm 12. The first connection portion 111 and the second connection portion 121 are inserted and fixed into the two grooves 201 respectively. The housing to be mounted 200 is further provided with a spring loaded bolt 202 corresponding to the hole 112. In an implementation, there are two spring loaded bolt 202 corresponding to two hole 112, and the two hole 112 are respectively formed in the first arm 11 and the second arm 12. When the first arm 11 and the second arm 12 are inserted into the two grooves 201 and are in position, each spring loaded bolt 202 will be inserted into the hole 112 under an elastic force, thereby locking the first arm 11 and the second arm 12 and preventing the first arm 11 and the second arm 12 from sliding in the two grooves 201. It can be understood that when removing the detachable support 100, a removal process of the detachable support 100 can be accomplished by simply retracting the spring loaded bolt 202 out from the hole 112.

It is noted that the spring loaded bolt 202 may be a bolt supported by a spring, and the bolt can be pull back to compress the spring by an external force. When the external force acted on the bolt is removed, the bolt will move back to an original position under the elastic force of the spring.

As an implementation, the hole 112 is configured as a countersunk hole.

An installation process of the detachable support 100 of the present disclosure can be accomplished by respectively inserting the first arm 11 and the second arm 12 into the two grooves 201 of the housing 200 to be mounted and enabling the spring loaded bolt 202 of the housing 200 to be mounted to be automatically inserted into the hole 112 under an action of an elastic force. The removal process of the detachable support 100 can be accomplished by simply retracting the spring loaded bolt 202 out from the hole 112. No tool is required throughout the installation and removal processes, thereby improving the efficiency of the installation and removal processes.

As an implementation of the present disclosure, the first arm 11 and the second arm 12 may be identical in structure, and the first arm 11 and the second arm 12 are symmetrically arranged. In this case, each of the two grooves 201 is provided with a spring loaded bolt 202. Specifically, referring to FIG. 3, the first arm 11 in in a substantially elongated shape. The first arm 11 includes a free end 113 and a fixed end 114. The fixed end 114 is hinged with the first end portion 131. The first connection portion 111 is located at a position, close to the fixed end 114, of the first arm 11. The hole 112 is located adjacent to the free end 113. That is, the first arm 11 is inserted into the groove 201 from the fixed end 114 first. The purpose of this arrangement is to make a hinge point between the first arm 11 and the frame 13 and a hinge point between the second arm 12 and the frame 13 to be close to the centroid of the housing to be mounted 200, such that the rotation of the housing to be mounted 200 is not affected by the gravitational force of the housing to be mounted 200 and the mounting of the housing to be mounted 200 is more stable.

As an implementation, the length of each of the first arm 11 and the second arm 12 is proximately one half of the height of the housing to be mounted 200. Generally, the centroid of a housing for a product is close to the center thereof. The purpose of this arrangement is to make the hinge point between the first arm 11 and the frame 13, the hinge point between the second arm 12 and the frame 13, and the centroid of the housing to be mounted 200 to be collinear. It can be understood that the hinge point between the first arm 11 and the frame 13, and the hinge point between the second arm 12 and the frame 13 forms a rotation axis of the detachable support 100. In other words, the rotation axis of the detachable support 100 passes through the centroid of a product, such that the product can be flexibly rotated. On the other hand, this arrangement can prevent the detachable support 100 from falling off due to collision or accidental rotation.

For further details, please referring to FIG. 3. The width of the first arm 11 decreases from the free end 113 to the fixed end 114. The width described herein refers to the length of the first arm 11 in a direction perpendicular to the longitudinal direction of L. That is, the width of the fixed end 114 is less than that of the free end 113. The purpose of this arrangement is to facilitate insertion of the first arm 11 into the groove 201 of the housing to be mounted 200. Further, the connection portion (such as, the first connection portion 111 and the second connection portion 121) has a cross section in a substantial T-shape or dovetail shape.

As an implementation, the dimensions of each of the first arm 11 and the second arm 12 are appropriately smaller than that of the two grooves 201. With this configuration, there is sufficient space between an arm (such as, a first arm 11 or a second arm 12) and the groove 201 to ensure that the arm can be inserted into or pulled out from the groove 201 smoothly, and the operation will not be affected by the components' manufacturing tolerances, coating thickness or presence of foreign matter in the groove 201. Furthermore, the first arm 11 is further provided with an abutment spring 203. The abutment spring 203 is located at a position, close to the fixed end 114, of the first arm 11. The abutment spring 203 is abutted between an inner wall of the groove 201 and one end of the first arm 11, such that the first arm 11 is forced against the inner wall of the groove 201. When the first arm 11 and the second arm 12 are inserted into the two grooves 201, the abutment spring 203 of the first arm 11 is deformed in a way that the resulting force presses the fixed end 114 against the inner wall of the groove 201 to compensate for the play of the first arm 11 in the groove 201.

As an implementation, the abutment spring 203 abuts between the inner wall of the groove 201 and the first arm 11, such that the first arm 11 has a tendency to slide out of the groove 201. With this configuration, when removing the detachable support 100, the retraction of the spring loaded bolt 202 from the hole 112 will cause the first arm 11 to eject by the relaxation of the abutment spring 203, such that the first arm 11 and the second arm 12 can be easily pull out from the two grooves 201 single-handed to complete the removal of the detachable support 100. In addition, the abutment spring 203 is located at a position, close to the fixed end 114, of the first connection portion 111 of the first arm 11, instead of being located at an end of the first arm 11, thereby avoiding increasing the length of the groove 201 and maintaining a compact structure of the product. It is noted that, in other embodiments of the present disclosure, the structure of the first arm 11 can be different from that of the second arm 12. For example, the second arm 12 may be configured without a hole, and the detachable support 100 can be fixed effectively.

As an implementation, the frame 13 includes a U-shaped frame 130 and two abutment rods 133. It is noted that the first end portion 131 and the second end portion 132 are formed on the U-shaped frame 130. Each of the two abutment rods 133 is rotatably connected with the U-shaped frame 130 through a bolt (not numbered). Each of the two abutment rods 133 is provided with a first abutment member 135, the U-shaped frame 130 has a second abutment member 136, and the first abutment member 135 is operable to be abutted against and engaged with the second abutment member 136 such that each of the two abutment rods 133 is stationary relative to the U-shaped frame 130. As an implementation, the first abutment member 135 may be a positioning pin, and the second abutment member 136 is an opening corresponding to the positioning pin. The positioning pin is operable to be engaged into the opening to prevent each abutment rod 133 from rotating relative to the U-shaped frame 130. It is noted that a mounting angle of the housing to be mounted 200 can be adjusted by adjusting a position of the positioning pin at each abutment rod 133 and a position of the opening at the U-shaped frame 130.

Referring to FIG. 4, the U-shaped frame 130 further has a third abutment element 137. As an implementation, the third abutment element 137 is also an opening. The first abutment member 135 is operable to be abutted against and engaged with the third abutment element 137 such that the normal projection of each abutment rod 133 is substantially fell into the normal projection of the U-shaped frame 130 is located (that is, each abutment rod 133 is substantially coincident with the U-shaped frame 130). With this configuration, when the two abutment rods 133 are not in use, the two abutment rods 133 can be retracted to coincide with the U-shaped frame 130, thereby facilitating the package and transportation, carry in a freehand manner, and space saving and esthetics when the U-shaped frame 130 is suspending.

As an implementation, in order to strengthen the rigidity of the U-shaped frame 130 and the two abutment rods 133, reinforcing grooves or ribs can be arranged on the U-shaped frame 130 and the two abutment rods 133.

As an implementation, the detachable support 100 further includes a brake disk 115 and a brake member 116. The brake disk 115 is fixedly connected with the first arm 11 by screws. The brake disk 115 is interposed between the first arm 11 and the U-shaped frame 130. The brake member 116 is connected to the U-shaped frame 130. The brake member 116 includes a brake bolt 1162 and a knob 1161, and the brake bolt 1162 extends through the U-shaped frame 130 and is connected with the knob 1161. The brake bolt 1162 is contacted with the brake disk 115. The brake bolt 1162 presses the brake disk 115 by screwing the knob 1161 to prevent the first arm 11 from rotating relative to the frame 13. When the knob 1161 is loosened, the housing to be mounted 200 can drive, under an action of an external force, the first arm 11 to rotate relative to the U-shaped frame 130, thereby adjusting the mounting angle of the housing to be mounted 200.

Referring to FIG. 5 and FIG. 6, a luminaire 500 is provided. The luminaire 500 includes a housing to be mounted 200 and a detachable support 100 of any of the above-mentioned implementations. The relationship between the housing 100, the detachable support 100, and a connection relationship therebetween have been described above, and will not be described herein.

The term such as "one embodiment", "some embodiments", "example", "specific example", and "some examples" referred to herein means that a specific feature, structure, material or characteristic described in connection with the embodiment or example is included in at least one embodiment or example of the present application. The schematic expressions of the above-mentioned terms referred to herein are not necessarily referring to the same embodiment or example. Furthermore, the specific feature, structure, material, or characteristic described may be combined in a suitable manner in any one or more embodiments or examples.

The embodiments of the present disclose have been described in detail above. The principles and implementations of the present disclose are described in the specific examples. The description of the above embodiments is set forth solely to assist in understanding the method and core ideas of the present disclosure. Meanwhile, those skilled in the art may make modifications to the specific implementations and application range according to the idea of the present disclosure. Therefore, the content of this specification should not be construed as limiting the scope of the present disclosure.

What is claimed is:

1. A detachable support, comprising:
a first arm having a first connection portion;
a second arm having a second connection portion; and
a frame having a first end portion and a second end portion, which are respectively hinged to the first arm and the second arm;
wherein the first connection portion and the second connection portion are operable to be detachably inserted into two grooves respectively, the two grooves being defined in a housing to be mounted, and the housing being operable to be fixedly arranged between the first end portion and the second end portion; and
the first arm has a hole, the housing to be mounted is provided with a spring loaded bolt, and the spring loaded bolt is operable to be inserted into the hole to lock the first arm.

2. The detachable support of claim 1, wherein the first arm and the second arm are symmetrically arranged, the first arm includes a free end and a fixed end, the fixed end is hinged with the first end portion, and the first connection portion of the first arm is adjacent to the fixed end.

3. The detachable support of claim 2, wherein the width of the fixed end is less than that of the free end.

4. The detachable support of claim 1, further comprising a brake disk and a brake member, wherein the brake disk is fixed on the first arm, the brake member is connected with the frame, and the brake member presses the brake disk to prevent the first arm from rotating relative to the frame.

5. The detachable support of claim 1, wherein the frame comprises:
a U-shaped frame, the first end portion and the second end portion being formed on the U-shaped frame; and
two abutment rods rotatably connected to the U-shaped frame;
wherein each abutment rod is provided with a first abutment member, the U-shaped frame has a second abutment member, and the first abutment member is operable to be abutted with the second abutment member such that each abutment rod is stationary relative to the U-shaped frame.

6. The detachable support of claim 5, wherein the U-shaped frame further has a third abutment element, the first abutment member is operable to be abutted with the third abutment element such that the normal projection of each abutment rod is substantially fell into the normal projection of the U-shaped frame.

7. The detachable support of claim 1, wherein the hole is configured as a countersunk hole.

8. A luminaire, comprising the housing to be mounted and the detachable support of claim 1, wherein:
the housing to be mounted has the two grooves and the spring loaded bolt corresponding to the hole.

9. The luminaire of claim 8, further comprising an abutment spring, the abutment spring is abutted between an inner wall of the groove and the first arm, such that the first arm is attached to the inner wall of the groove.

10. The luminaire of claim 8, wherein the length of each of the first arm and the second arm is half of the height of the housing to be mounted.

11. The luminaire of claim 8, wherein a hinge point between the first arm and the frame, a hinge point between the second arm and the frame, and the centroid of the housing to be mounted are collinear.

* * * * *